United States Patent [19]

Miksitz

[11] Patent Number: 5,003,920
[45] Date of Patent: Apr. 2, 1991

[54] ANIMAL LITTER CLEANING APPARATUS

[75] Inventor: Frank J. Miksitz, Phillipsburg, N.J.

[73] Assignee: UFI, Inc., Phillipsburg, N.J.

[21] Appl. No.: 552,304

[22] Filed: Jul. 13, 1990

[51] Int. Cl.⁵ .............................................. A01K 29/00
[52] U.S. Cl. .................................. 119/163; 119/57.6
[58] Field of Search ................. 119/1, 56.2, 57.5, 57.6

[56] References Cited

U.S. PATENT DOCUMENTS

| | | | |
|---|---|---|---|
| 4,465,018 | 8/1984 | Mopper | 119/1 |
| 4,493,288 | 1/1985 | Van der Kolk | 119/1 |
| 4,660,506 | 4/1987 | Nalven | 119/1 |
| 4,844,011 | 7/1989 | Strickland | 119/1 |
| 4,854,267 | 8/1989 | Morrow | 119/1 |
| 4,862,830 | 9/1989 | Michael | 119/1 |
| 4,934,317 | 6/1990 | Pourshalchi | 119/1 |

*Primary Examiner*—John G. Weiss
*Attorney, Agent, or Firm*—Fisher, Christen & Sabol

[57] ABSTRACT

An animal litter apparatus includes litter supply bin pivotally mounted above a litter trough. The litter supply bin has an opening at the lower end thereof to allow dispensing of the litter on the trough by the oscillating movement of the supply bin. As the bin swings in a forward direction, litter is pushed along the trough to form a litter bed. Continued oscillations of bin push the spent litter in the trough to a collection receptacle. The collection receptacle may include a washing apparatus to spray water onto the spent litter and carry the litter and animal waste to a sewer system.

19 Claims, 2 Drawing Sheets

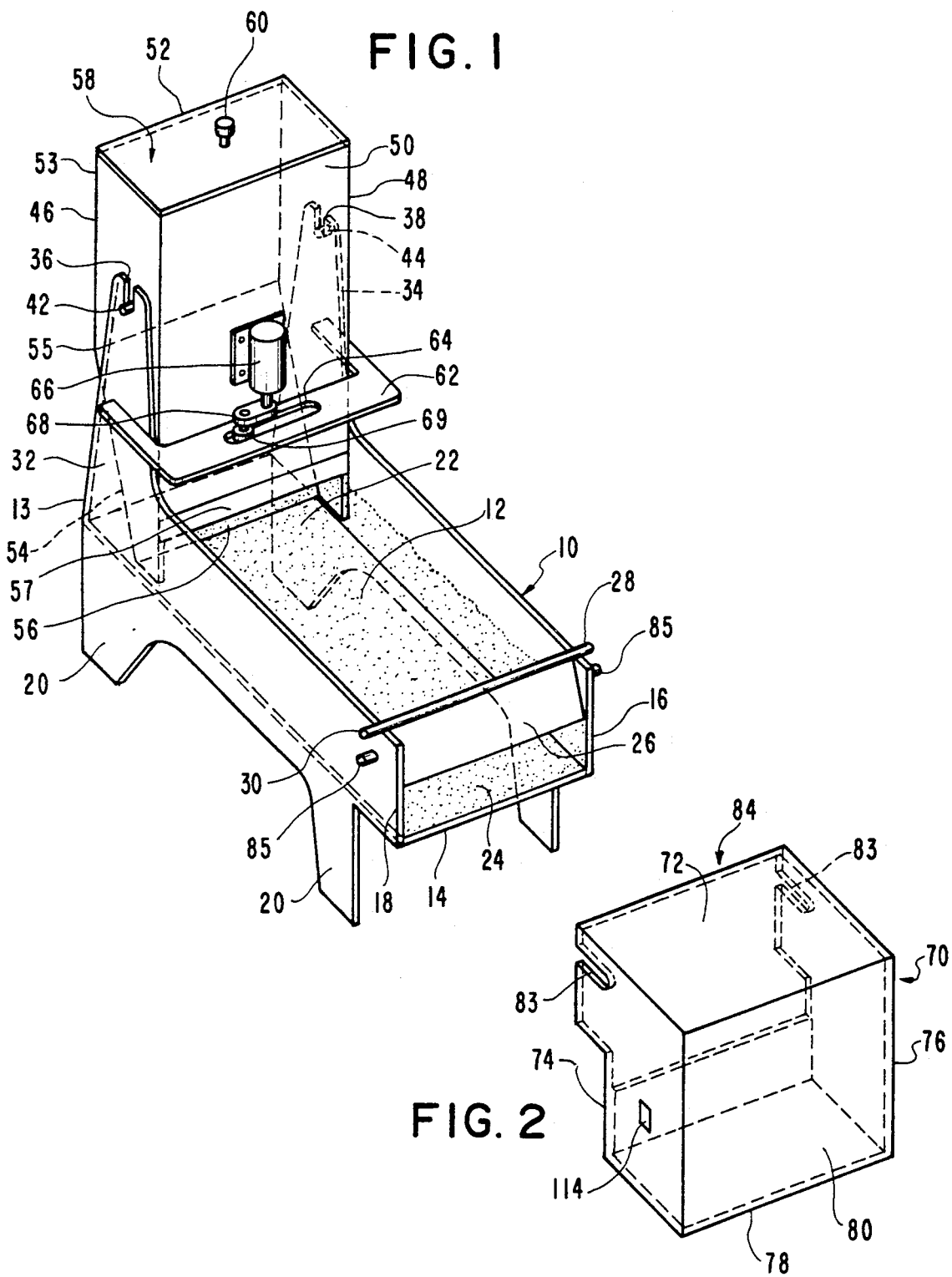

ANIMAL LITTER CLEANING APPARATUS

FIELD OF THE INVENTION

The present invention is directed to a litter bed apparatus for animals. More particularly the invention is directed to an apparatus for automatically feeding fresh litter into a litter tray and removing the used litter to a collection or storage container without the need to handle the used litter.

BACKGROUND OF THE INVENTION

The keeping of domestic pets, and particularly cats, requires the use of a suitable litter box or litter container to maintain a sanitary condition in the home. Conventional litter boxes generally use of litter of clay particles or dried vegetation and have the advantage of being a natural attractant for animals to eliminate body waste. Litter boxes, however, have the disadvantage of producing unpleasant odors when the litter is not changed on a routine basis. Spent litter and animal waste in the litter further creates health hazards for the occupants of the house. The chore of routine changing a litter box is undesirable, and contributes to the reluctance of pet owners to frequently change the litter. The handling of used litter also creates a potential health risk as well as the unpleasant nature of the chore.

The problem of handling used litter has resulted in the development of numerous devices which contain the used litter and reduce the need to handle the spent litter and animal waste. One example of such a device is disclosed in U.S. Pat. No. 4,493,288. A continuous litter cleaning device is disclosed which includes a storage bin for fresh litter and a litter box. The bottom of the litter box is formed from a conveyor belt to carry spent litter to the collection tray positioned below the litter box. The conveyor is operated by a ratchet and gear arrangement actuated by the weight of the animal on a treadle. During entry and exit of the animal from the litter box, the treadle is actuated to operate the conveyor belt and feed the spent litter and animal waste to the collection tray.

U.S. Pat. No. 4,574,735 discloses an electrically operated litter cleaning system. The apparatus includes a litter containment portion and a rake assembly rotating on a centrally located spindle. As the spindle rotates the rake assembly, solids waste from the litter are raked outwardly toward the collection container. Liquid waste is disposed of through a drain opening in the litter containment portion which directs the liquid to the collection container.

Another example of animal litter devices is disclosed in U.S. Pat. No. 3,621,817. This device includes a fresh litter supply and litter tray having a longitudinal aperture. A collection bowl is positioned below the aperture to collect the waste. A spring operated mechanism actuated by the weight of the animal tips and rotates the collection bowl to disperse the waste in the litter.

Still another example of litter containment devices is shown in U.S. Pat. No. 4,667,622. The litter device includes a first compartment for fresh litter and a second compartment for receiving and storing spent litter. The compartments are arranged in the device such that when tilted, the spent litter pours into the second compartment and fresh litter is simultaneously poured into the litter tray area.

The above-noted devices do not provide sufficient odor control and generally require some handling of the used litter. There is still a need for a litter device that is self cleaning and eliminates the need to handle used litter. The present invention is accordingly directed to a litter maintenance apparatus which includes a supply of fresh litter and a device to feed the bed of fresh litter to the litter tray. The device further includes a collection receptacle and a mechanism to wash the used litter and animal waste to a sewage disposal system.

SUMMARY OF THE INVENTION

The disadvantages and limitations of the prior litter boxes are obviated by the present invention while providing easy and efficient changing of the litter bed without handling the used litter. The apparatus includes a trough area of a sufficient size to hold a bed of litter. The trough may be square or rectangular and includes a charging end and a discharging end at the opposite end of the trough. A fresh litter dispensing apparatus is suspended from two trunnions on upright members extending from the sides of the trough at the charging end of the trough. The litter dispensing apparatus includes a container having a pair of side walls, a front wall and a rear wall. The rear wall is slightly longer than the front wall. The lower portion of the rear wall converges toward the front wall to form a chisel-like shape and extends below the front wall to define a substantially horizontal opening in the bottom of the container facing the center of the trough and the discharge end. The opening appears as a horizontal slot having a width slightly smaller than the width of the trough and a height corresponding to the approximate desired height of the litter bed. The top portion of the container is provided with a removable lid to fill the container with fresh litter. The container is supported by the trunnions received in slots in the upright members to oscillate the container in a forward and backward movement. The container is supported such that the bottom of the container is closely spaced from the floor of the trough.

In one embodiment, an eccentric arm or cam, cam follower and electric motor arrangement is provided to oscillate the litter container suspended from the trunnions. A bracket extends between the upright members on the sides of the trough and has a slot traverse to the oscillating movement of the container. The motor is mounted on the front side of the container with the eccentric cam element cooperating with the slot in the bracket. Actuating the motor causes the eccentric cam element to rotate within the slot and oscillate the litter supply container in forward and rearward motion.

Fresh litter in the supply container initially falls out of the opening by gravity onto the floor of the trough. The forward motion of the bin and the rear wall of the bin pushes the litter along the length of the trough. The rearward movement of container creates a void in the bed of litter in the trough which is filled by litter dropping from the supply bin. As the supply bin is pivoted back and forth, a bed of litter is incrementally pushed along the length of the trough in a step-wise fashion to form a continuous bed of litter in the trough. The electric motor is then disconnected to cease the oscillating movement.

The litter bed may be changed by simply actuating the motor to resume the oscillating movement of the container. Fresh litter is then dispensed from the container and pushed along the trough while the spent litter is push through the discharge end of the trough to a collection receptacle for subsequent disposal. The electric motor may be controlled by a suitable timer or microprocessor.

The collection receptacle may be of a sufficient size to hold the spent litter such that only occasional emptying is needed. Preferably the collection receptacle includes a solenoid actuated water spray to wash the spent litter and convey the litter and animal waste to a sewage disposal system. The collection receptacle may include a suitable pump to transfer the spent litter to the sewage system. The receptacle may further include a comminuting device to reduce the size of the solids to a suitable particle size such that they can be more easily pumped to the sewage system. A gravity operated closure flap may also be provide on the entrance to the collection receptacle to prevent escape of odors and the water spray from soaking the litter in the trough.

In an alternative embodiment, the trough may be provided with a perforated floor or a floor having a longitudinal slot or other drain to receive liquid waste passing through the bed of litter. A collection or pan is positioned below the trough to receive the liquid waste which is transferred to the collection receptacle or to the sewage system.

BRIEF DESCRIPTION OF THE DRAWINGS

The present invention is more clearly understood from the following detailed description and to the drawings of which the following is a brief description.

FIG. 1 is a perspective view of one embodiment of litter trough and litter supply bin of the invention.

FIG. 2 is a perspective view of a waste collection receptacle used with the litter trough of FIG. 1.

DETAILED DESCRIPTION OF THE INVENTION

Figure 3:
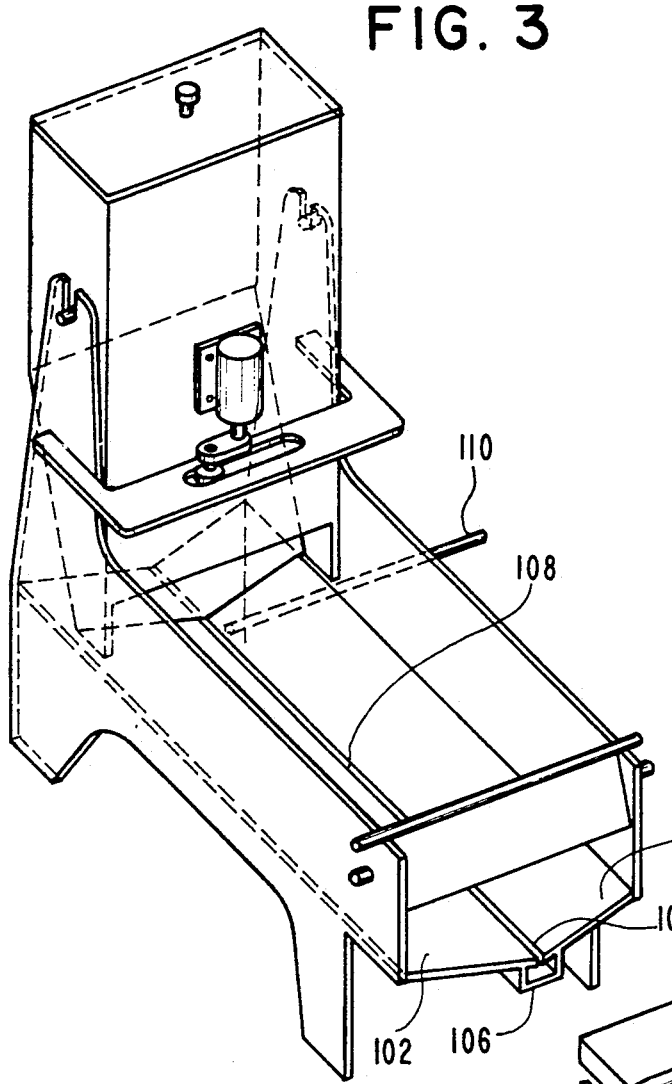
FIG. 3 is a perspective view of an alternative embodiment of the waste collection receptacle.

The invention is directed to an animal litter bed having a supply container for fresh litter and a collection receptacle to receive the used litter. The litter supply container includes an arrangement to feed the litter to the trough to form a bed of litter and to move the bed of litter across the trough toward the collection receptacle.

Referring to FIG. 1, the litter apparatus 10 includes a litter trough 12 having a bottom floor portion 14 and opposite side wall members 16 and 18. Leg members 20 are positioned at the corners of the trough 12 to raise the trough from the floor. Wheels or casters (not shown) may be provided on the legs 20 to enable the apparatus to be easily moved from one location to another.

The trough as shown in FIG. 1 is preferably a rectangular shape having a longitudinal dimension and a transverse dimension. The trough may alternatively be square and of a size suitable for use as an animal litter box. The trough is sufficiently deep to hold an effective amount of litter, such as for example about four to eight inches.

The trough 12 includes a rear wall panel member 13 at a charging end 22 of the trough. The trough is open at the opposite end to define a discharge end 24 of the trough. The bottom 14 of the trough may be slightly sloped toward the discharge end of the trough. Typically, the inclined bottom will be at an angle of about 5° to about 10°. A gravity operated closure gate or flap 26 is pivotally mounted to the upper edges of the side walls of the trough by trunnions 28 and 30. In the rest position, the closure flap may be spring actuated in a closing direction. The closure flap serves as an end wall of the trough at the discharge end to retain the litter in the trough and to serve as a closure for a litter collection receptacle as discussed hereinafter in greater detail.

The side wall members 16 and 18 of the trough 12 include upright members 32 and 34 at the charging end 22 of the trough. Each upright member 32 and 34 includes a substantially vertical slot 36 and 38 to support a fresh animal litter storage bin 40. The storage bin 40 includes a pair of trunnions 42 and 44 extending from opposites sides of the bin and are pivotally received in the vertical slots 36 and 38 of the upright members 32 and 34, whereby the bin is able to oscillate in a forward and backward direction. The storage bin is suspended from the trunnions such that the bottom of the bin is closely spaced to the floor of the trough and the sides of the bin are closely spaced to the side walls of the trough. The storage bin 40 includes a pair of opposite sides 46 and 48, a front panel 50 and rear panel 52. The rear panel as shown includes an upper portion 53 which is substantially parallel to the front panel 50, and a lower portion 54 converging toward the front panel to define a substantially wedge or chisel-shaped storage bin. As shown in FIG. 1, the front panel 50 and the rear panel 52 of the storage bin 40 converge to define an opening 56. The front panel 50 as shown is shorter than the rear panel 52 such that the opening 56 has the shape of a substantially horizontal slot having a height and a width.

The opening 56 extends substantially the full width of the supply bin 40. In the preferred embodiment of the invention, the supply bin 40 has a width slightly less than the width of the trough such that the bin 40 can oscillate between the side walls 16 and 18 of the trough in a close relationship. In this manner the litter is partially inhibited from passing between the sides of the bin 40 and the side walls of the trough. A rear collection tray is preferably provided to collect litter which is pushed rearwardly by the reciprocating movement of the bin. The upright members 32 and 34 may further be provided with height adjustment means to adjust the spacing of the lower rear panel 54 from the floor of the trough and the height of the litter bed. The bin 40 is further pivotally suspended on the upright members 32 and 34 such that the lower rear panel 54 is closely spaced from the floor of the trough. The height of the opening 56 is selected to correspond to approximately the desired height of the litter bed to be formed in the trough as discussed hereinafter in greater detail. The front side 50 of the bin 40 may alternatively include a vertically sliding gate or closure 57 to adjust the height of the opening 56 and accordingly the height of the litter bed formed in the trough.

The storage bin further includes a lid 58 having a handle 60. The lid may be pivotally connected to the bin or held in place by suitable friction means to be easily removable and to permit filling of the bin with fresh litter.

As shown in FIG. 1, a horizontal transversely mounted plate member 62 extends between the upright members 32 and 34. A longitudinal slot 64 is provided in the horizontal plate 62 extending transversely to the trough. An electric motor 66 is mounted on the front panel of the bin. An eccentric arm 68 is fixed to the shaft of motor 66 and a bearing 69 is rotatably mounted on the eccentric arm 68 at the end opposite of the motor shaft. The motor is positioned on the front panel of the bin such that the bearing is received in the slot 64 of the horizontal plate 62. The motor may then be actuated to produce an oscillating movement of the storage bin as discussed hereafter in great detail.

In a further embodiment of the invention the lower rear panel 54 of the bin 40 may be pivotable in a forward direction at the connection 55 between the lower panel 54 and the upper panel 53. A suitable stop member is provided to prevent the lower panel 54 from pivoting rearward beyond the point shown in FIG. 1. In this manner, the forward swing of the bin will cause the lower rear panel 54 to push the litter toward the discharge end of the trough. On the rearward swing of the bin, the pivotally mounted lower rear panel 54 may pivot to allow the panel to side over any litter on the trough which may be on the rear side of the bin and to prevent large amounts of litter from being pushed over the rear side 13 of the trough or to prevent jamming or binding of the bin.

Referring to FIG. 2, a collection receptacle 70 is removably mounted at the discharge end 24 of the trough. The collection receptacle 70 in one embodiment of the invention has a box-like structure having a top 72, side walls 74, 76, bottom 78, rear side wall 80 and a front side wall 82. An opening 84 on the front side 82 of the receptacle 70 has dimensions complementing the width and height of the trough. The receptacle includes a pair of slots 83 which cooperate with hook members 85 mounted on each side wall 16 and 18 of the trough to support receptacle 70 and attach the receptacle to the trough. The closure flap 26 serves as a closure for the receptacle and is positioned on the side walls of the receptacle to effectively close the collection receptacle to prevent the escape of odors from the spent litter. The collection receptacle may include a disposable liner or bag to receive the spent litter and animal waste. When cleaning is needed, the bag is removed with the contents and disposed of in a suitable manner.

FIG. 3 illustrates an alternative preferred embodiment where the collection receptacle 86 includes a water supply 88 and a plurality of spray nozzles 90 to direct a spray of water to the interior of the receptacle. A drain 92 is provided in the bottom 94 of the receptacle 86 which is connected to an electric pump 96. The pump includes a discharge conduit 98 connected to the sewer system to pump the water, spent litter and animal waste from the receptacle 86 to the sewer. In one embodiment, a comminuting device 99, such as conventional waste disposal unit, is connected to drain 92 to reduce the solids to a suitable particle size such that the animal waste and litter can be easily pumped to the sewer system. The water supply 88 is controlled by a solenoid actuated shut-off valve 100. The solenoid, comminuting device and water pump are preferably controlled and actuated by a timer or microprocessor 101 to actuate the device at a controlled time and sequence as discussed hereinafter.

Figure 4:
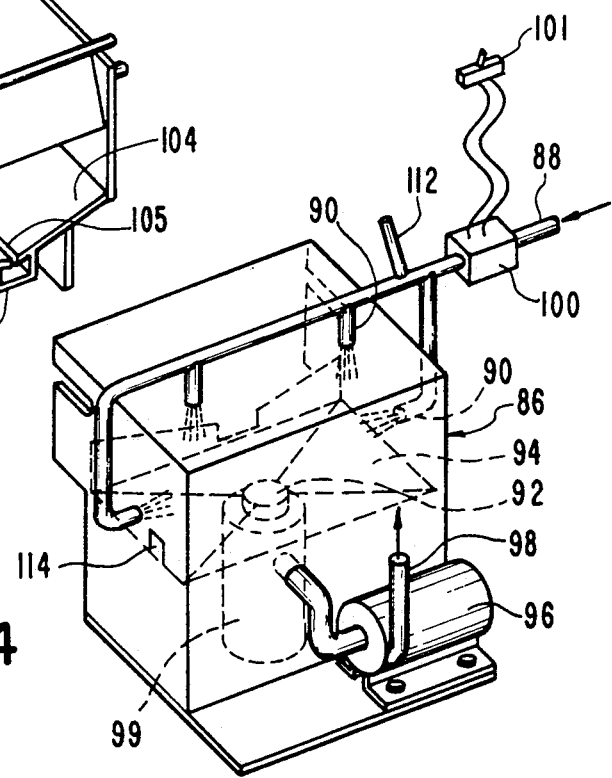
FIG. 4 is a perspective view of an alternative embodiment of the litter trough and litter supply bin of the invention.

In a further embodiment of the invention shown in FIG. 4, the trough is provided with inclined surfaces 102, 104 to form a substantially V-shaped floor. The floor surfaces 102 and 104 are spaced apart a distance to define a slot 105 in the bottom of the trough. A drain or gutter 106 is attached to the underside of the bottom of the trough along the slot and extends the length of the slot. The drain 106 terminates at a position within the collection receptacle. In this embodiment, a substantially nonabsorbent litter can be used in the trough such that liquid waste will pass through the litter and flow through the slot 105 to the drain 106 and to the receptacle. A removable wire mesh or screen 108 is provided over the slot 105 to prevent excess litter from falling into the drain 106. A fresh water supply conduit 110 is connected to the drain 106 to periodically wash the animal waste from the drain 106 into the receptacle 86. The wash water and animal waste in the receptacle 86 will then be transferred to the sewer system.

The microprocessor 101 may be of any suitable design as well known in the art to actuate the apparatus at preselected intervals. The microprocessor as depicted in FIG. 3 may be arranged to actuate the solenoid 100 to introduce a supply of fresh water through the conduits to the nozzles 90. The water supply 88 is preferably connected to the conduit 110 of the drain 106 by a conduit 112 to provide wash water to the drain 106. The microprocessor may sequentially or simultaneously actuate the water supply solenoid 100, comminuting device 99, pump 96, and the electric motor 66 to produce a cleaning and litter replenishing cycle.

The collection receptacle 86 as shown in FIG. 3 may contain a load sensor or other indicating means 114 to indicate the volume of litter and animal waste in the collection receptacle. The indicating means 114 may for example be a viewing window, indicator light or mechanical indicator. The load sensor may be connected to the microprocessor 101 to actuate the wash cycle when sufficient waste is collected in the receptacle.

The collection receptacle 86 and the drain 106 may further be provided with a device to release a detergent, disinfecting or other cleaning compound when the wash cycle is actuated. In this manner the device is cleaned and disinfected.

The animal litter used may be any conventionally used litter such a granulated clay or vegetable matter, such as shredded vegetation or wood chips. In one embodiment of the invention the litter is a non-absorbent litter such that liquid waste will drain through the litter to the collection receptacle. The litter may contain fragrances, odor absorbing agents, and disinfectants as well known in the art.

In operation of the litter device the storage bin is filled with fresh litter through the top of the bin. Litter begins to fall through the opening at the bottom of the bin and onto the bottom of the trough until the height of the litter on the trough reaches the upper edge of the opening in the bin. The electric motor is then actuated to slowly oscillate the bin backwards and forwards in a longitudinal direction to the trough. The forward swing of the bin pushes the fresh litter from the charging end of the trough toward the discharge end. This rearward swing of the bin creates to void in the litter on the trough which is filled by fresh litter falling by gravity from the bin. The bin will again swing in the forward direction pushing the litter toward the discharge end of the trough. The repeated oscillating movement of the bin will produce a compaction zone in front of the bin and incrementally push the litter bed along the trough to form a continuous litter bed. The motor is stopped when the litter bed is formed in the trough.

After the litter bed has been used by the animal and changing is needed, the motor is again actuated to oscillate the bin. The oscillating motion of the bin supplies fresh, clean litter from the bin and incrementally pushes the spent litter through the flap and into the collection receptacle. When the collection receptacle used is as in FIG. 2, the spent litter may be stored until sufficient volume is accumulated to require emptying. The receptacle is essentially closed by the flap to contain the odors from the spent litter and animal waste.

In the embodiment shown in FIG. 3, the microprocessor actuates the solenoid to start the flow of water, actuate the comminuting device and the pump when the spent litter is pushed through the flap to the receptacle. The washing and pump cycle is continued for a period of time after the fresh supply of litter is ceased to ensure complete removal of the spent litter and animal waste from the receptacle.

The microprocessor will generally include a timer to actuate the motor of the supply bin to initiate litter changing cycles at predetermined intervals. The washing cycle of the water spray, comminuting device and pump is started either simultaneously with the start of the litter feeding cycle or delayed for a predetermined period of time. Alternatively, the receptacle may include a load sensor 114 to activate the washing cycle when a predetermined amount of litter and animal waste has been pushed into the receptacle.

The above detailed description is intended to be exemplary of the preferred embodiments of the invention. It will be readily understood that numerous alternative embodiments and modifications can be made by those skilled in the art without departing from the spirit and scope of the invention.

What is claimed is:

1. An animal litter apparatus comprising;
   a trough to support a bed of litter and having a first charging end and second discharging end;
   a litter supply bin having a horizontal slot to define a litter discharge opening in a bottom portion of said bin, said discharge opening having a width and a height, and wherein said supply bin is pivotally mounted above the trough for oscillating movement in a longitudinal direction to the trough;
   oscillating means to oscillate said supply bin whereby litter in said supply bin falls by gravity onto said trough during a rearward movement of said bin and incrementally pushes said litter on the trough toward said discharge end of the trough to form a litter bed.

2. The animal litter apparatus of claim 1 wherein said trough is inclined toward said discharge end.

3. The animal litter apparatus of claim 1 wherein said trough includes a pivotally mounted closure gate at said discharge end.

4. The animal litter apparatus of claim 1 wherein said oscillating means includes an electric motor with a driven shaft having an eccentric arm having a roller member at one end thereof, wherein said roller member is operatively connected to a fixed plate having a slot therein, whereby rotary movement of said driven shaft produces oscillations of said bin.

5. The animal litter apparatus of claim 1 including means to selectively adjust the height of the slot in the bin.

6. The animal litter apparatus of claim 1 comprising a collection receptacle at the discharge end of said trough to receive spent litter pushed from said discharge end of the trough by said pivotal movement of the supply bin.

7. The animal litter apparatus of claim 6 wherein a load indicator means is provided in the collection receptacle.

8. The animal litter apparatus of claim 6 wherein said collection receptacle includes water supply means and spraying means to direct water onto spent litter and animal waste in said collection receptacle to produce a suspension, and pump means to pump said suspension to a sewage disposal means.

9. The animal litter apparatus of claim 8 further including comminuting means to reduce the particle size of said spent litter and animal waste, said comminuting means operatively connecting said receptacle with said pump means.

10. The animal litter apparatus of claim 6 wherein said pump means is a centrifugal pump.

11. The animal litter apparatus of claim 1 wherein said trough includes two incline floor members converging toward a longitudinal axis of said trough and being spaced apart to define a longitudinal slot in the floor of said trough, said trough further including drain means positioned below said slot and communicating with a collection receptacle.

12. The animal litter apparatus of claim 11 including water supply means to direct a flow of water into said drain means.

13. The animal litter apparatus of claim 11 comprising a screen bridging said longitudinal slot to prevent litter and animal waste from entering said slot.

14. The animal litter apparatus of claim 6 including water spray means to direct water onto said sides of said receptacle.

15. The animal litter apparatus of claim 6 including timing means to actuate said oscillating means thereby replenishing said litter bed with litter from said supply bin and pushing spent litter and animal waste from said discharge end of the trough into a collection receptacle.

16. The animal litter apparatus of claim 15 including sensing means to sense the presence of litter or animal waste in said collection receptacle and means to actuate said spray means and pump means for sufficient time to pump said litter and animal waste to a sewage system.

17. An animal litter apparatus comprising;
   a trough to support a bed of litter and having a litter receiving end and a litter discharge end, a pair of upright side walls, and a front wall at said litter receiving end, said trough having an open end at said litter discharge end;
   a litter supply bin pivotally mounted above said trough at the litter receiving end for oscillating movement in a longitudinal direction of the trough from said receiving end to the discharge end, said supply bin having a horizontal slot to define a litter discharge opening in a bottom portion of said bin and facing said discharge end of the trough, said opening having a width and a height; oscillating means to oscillate said supply bin whereby litter in said supply bin falls by gravity onto said trough during a rearward movement of said bin and incrementally pushes said litter on the trough toward said discharge end of the trough during a forward movement of the bin whereby a litter bed is formed;
   a collection receptacle disposed at said discharge end to receive litter and animal waste from said litter bed pushed by said oscillating movement of the supply bin.

18. The animal litter apparatus of claim 17 wherein said collection receptacle includes means to spray wash water into said collection receptacle, comminuting means to reduce the particle size of litter and animal waste, and pump means to pump said water, litter and animal waste to a sewage system.

19. The animal litter apparatus of claim 18 wherein said collection receptacle includes sensing means to sense the presence of animal waste and litter, and wherein said sensing means activates said pump means.

* * * * *